H. M. SWEET.
GANG PLOW.
APPLICATION FILED JAN. 29, 1917.

1,438,146.

Patented Dec. 5, 1922.
6 SHEETS—SHEET 1.

H. M. SWEET.
GANG PLOW.
APPLICATION FILED JAN. 29, 1917.

1,438,146.

Patented Dec. 5, 1922.
6 SHEETS—SHEET 4.

Inventor
HOWARD M. SWEET,

Witness

By
Charles E. Wisner.
Attorney

H. M. SWEET.
GANG PLOW.
APPLICATION FILED JAN. 29, 1917.

1,438,146.

Patented Dec. 5, 1922.
6 SHEETS—SHEET 6.

Inventor
HOWARD M. SWEET.

Witness

By

Attorney

Patented Dec. 5, 1922.

1,438,146

UNITED STATES PATENT OFFICE.

HOWARD M. SWEET, OF DETROIT, MICHIGAN, ASSIGNOR, BY DIRECT AND MESNE ASSIGNMENTS, TO REX TRACTOR CO., OF DETROIT, MICHIGAN, A CORPORATION OF MICHIGAN.

GANG PLOW.

Application filed January 29, 1917. Serial No. 145,286.

*To all whom it may concern:*

Be it known that I, HOWARD M. SWEET, a citizen of the United States, residing at Detroit, county of Wayne, State of Michigan, have invented a certain new and useful Improvement in Gang Plows, and declare the following to be a full, clear, and exact description of the same, such as will enable others skilled in the art to which it pertains to make and use the same, reference being had to the accompanying drawings, which form a part of this specification.

This invention relates to gang plows and its object is a series of plows supported by a frame work and adapted to be drawn by any convenient means, and including means for manipulating the plows through operation of the draft means. While the usual draft animal may be used in operation of the gang, the preferred apparatus is a self-propelled vehicle, as a tractor, but in either case a pair of draft wheels are employed operating in conjunction with mechanical means to handle the plows individually. An object of the invention, therefore, is a series of plows carried by a frame work including a pair of driving wheels and mechanism whereby the power derived from the driving wheels may be utilized to manipulate the plows individually. Another object of the invention resides in the means whereby the mechanism is manipulated. The plow individually is controllable at will to draw the plow's point first out of the ground, or to position the same to readily draw point first into the ground.

For manipulation of the plows, a shaft is provided operable in conjunction with the driving wheels and by means of which the power may be applied to each plow at will, and the supporting frame work of the plows engages the shaft whereby the load imposed by drawing the gang and frame work is taken by the shaft. An object of the invention is a frame work and gang of plows supported thereby having a forward end of the frame work supported by a driving shaft as stated including means to allow limited movement of the shaft in a horizontal plane relative to the frame work. By such arrangement the driving wheels may be turned relative to the plow frame without necessity of twisting the frame. The driving wheels may thus be turned without necessity of turning the frame with all the plows in the ground, which would impose great strain upon the frame work and is avoided by this novel feature of allowing the movement of the draft means in horizontal plane relative to the frame. By first turning the wheels the frame will gradually draw into parallelism with the new direction of movement of the driving wheels, and an object of the invention is a means whereby the gang of plows may be so connected with the draft means, that the said draft means may be turned independently of the frame work of the plows. Other novel features are involved in the means employed in raising the plows out of the ground and in the means for manipulating the plows individually to enter the ground, and a further novel feature of the invention is involved in the means for supporting the plows by the frame work, said means being so arranged that any one or more of the plows may be disengaged from the frame work immediately on striking an obstruction of such character as to be liable to break the plow or connected parts.

These and other objects and the several novel features of the invention in its preferred form are hereinafter more fully described and claimed and shown in the accompanying drawings in which—

Fig. 3 is an enlarged side elevation partly in section showing one of the plows in the ground and parts for manipulating the plows to raise it out of the ground in position shown by dotted lines.

Similar characters refer to similar parts throughout the drawing and specification.

Figures 1, 11, 12:
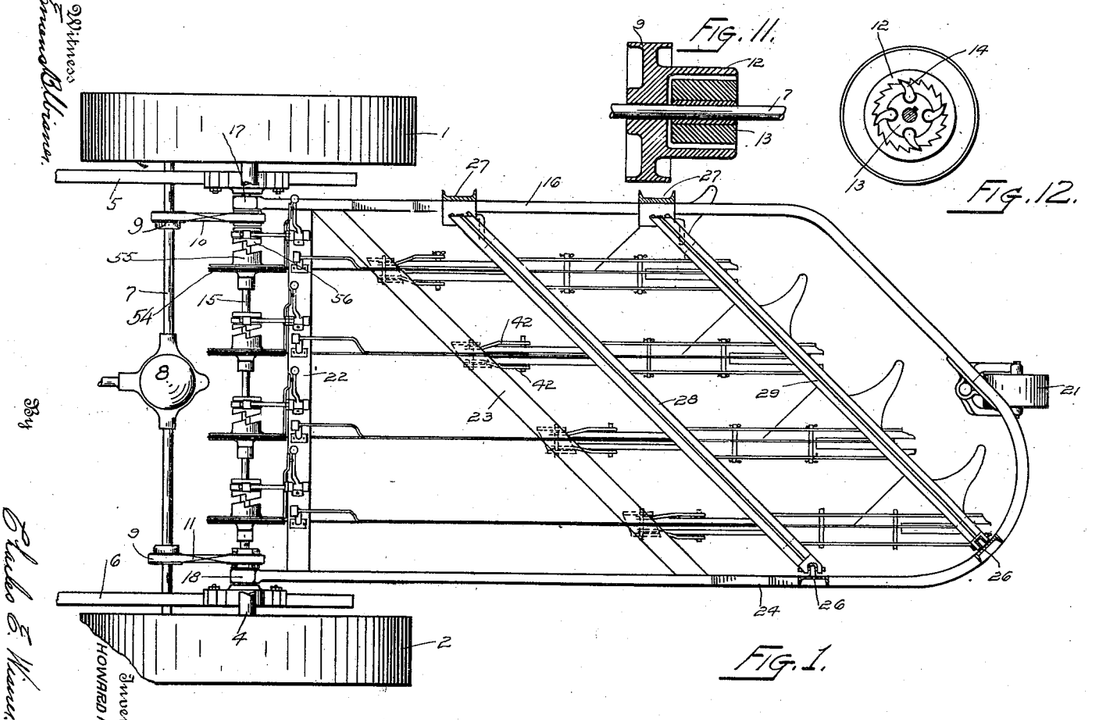
Fig. 1 is a plan view of a gang of plows involving my invention
Fig. 11 is a detail in section of the belt wheel utilized in the driving plow operating shaft.
Fig. 12 is an end view thereof.

As shown clearly in Figs. 1 and 3 the draft apparatus, which may be either self-propelled or drawn by horses, is provided with two drive wheels 1 and 2 preferably each provided with an internally toothed gear 3. These wheels as may be understood from Fig. 3 are supported on a shaft 4 on which the wheels are preferably mounted to rotate. This shaft preferably extends entirely across the frame members 5 and 6 of the draft apparatus and is carried in bearings on the upper side of said frames, but the shaft is shown as being broken away in Fig. 1 in order that other parts may be clearly shown. Also carried in bearings (not here shown) on the upper side of the frame members 5 and 6 is a shaft 7 having a gear on each end thereof meshing with the internal gear 3 on the driving wheels. This shaft is divided at the center and driven by the usual differential mechanism enclosed in a casing shown at 8, which mechanism is similar to that utilized in ordinary automobile construction. Near each end of this shaft 7 is a pulley wheel 9 on which are the belts 10 and 11 respectively. As shown in detail in Figs. 11 and 12 each pulley wheel 9 has a recessed internally toothed hub 12 and within this recess is a block 13 keyed to the shaft 7 and provided with pawls 14 adapted to engage the ratchet teeth on the interior of the hub. Both pulley wheels 9 are loose on the shaft and are driven by means of the pawls 14. Both of these pulley wheels are similarly cross belted by means of the belts 10 and 11 with the plow operating shaft 15 carried in bearings secured to the lower side of the frame members 5 and 6 directly beneath the wheel shaft 4. The reason for arranging the pulleys 9 to be driven by the pawl 12 and the ratchet as described, is to allow for the differential movement of the two parts of the driving shaft 7 and by thus arranging the drive pulleys 9, the shaft 15 will be continuously driven, if either of the driving wheels 1 or 2 are being driven.

Figure 2:
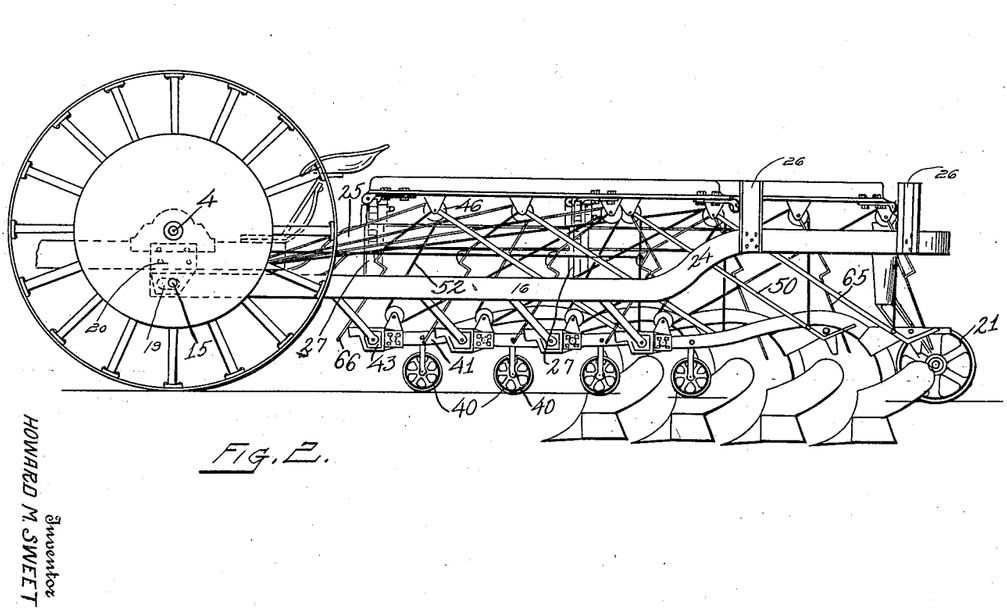
Fig. 2 is a side elevation thereof.

The main frame 16 for the plows is substantially U shaped in form and the ends 17 and 18 of the two legs are apertured to receive the shaft 15, which aperture is in the nature of a slot indicated at 19 in Fig. 2. Each end of the shaft 15 is supported by a bracket 20 as shown by dotted lines in Fig. 2, secured to each of the frame members 5 and 6. The shaft is thus fixed in position relative to and moves with the frame members 5 and 6 and may turn in fixed relation with the draft apparatus without movement of the plow frame by reason of the possible relative movement of the plow and draft frames. By this arrangement, the shaft on the inner side, for instance on making a turn may move relative to the frame 16 and thus to a limited extent the frame of the draft apparatus may be turned from one line of movement to another without forcibly turning the plow frame at the same time.

The purpose of this limited movement between the plow and draft frames is to allow the draft frame to be turned without at the same instant forcibly turning the plow frame with the plows in the ground. It is evident that, when the plows are inserted in the ground, the plow frame may not then be forcibly turned without distorting the frame relative to the plow operating and supporting parts. With the limited longitudinal movement described the draft apparatus including the wheels 1 and 2 may be turned slightly out of parallelism with the plow frame. This movement would tend to move the shaft 14 relatively backward in the slot therefor on the inside plow frame. As the draft apparatus continues in its new direction of movement, the plows and plow frame gradually assume the new direction of movement as they draw through the ground. Thus in plowing, if the furrow on the plowed side of the field becomes so great in width that the mold board no longer turns it over, the draft apparatus may be turned slightly toward the plowed side and, as the plow frame eventually straightens up, the plows gradually edge over toward the plowed side to cut a narrower furrow on the plowed side. It is evident of course that the furrows between the several plows will always be of the same relative width by reason of the spacing of the plows and it is only the furrow on the right hand side of the gang of plows shown that may become too wide. The whole purpose and function of this longitudinal movement of the plow and draft frames is to enable the change in direction of movement to be readily made while the plows are in the ground. At the rear this plow frame is supported by the caster wheel 21 pivoted to swing about a vertical axis, and thus adapted to follow any direction that the plow frame may be moved as will be readily understood.

A transverse member 22 is provided running across the two ends of the main frame 16 near the forward end thereof, and an angularly positioned frame 23 is also secured to said main frame on the lower side thereof. It will be observed in Fig. 2 that one leg of the frame 16 on one side of the machine is provided with a curved portion 24 near the rear end of the frame while the opposite side is provided with a similarly curved portion near the forward end thereof. This allows the angular positioned cross member 23 to be secured near the forward end of one side and secured to the other side at the same level near the rear portion of the frame. This member 23 also provides the draft beam for the entire gang of plows as is hereinafter described. Each side leg of the main frame is provided with uprights 26—26 on one side and 27—27 on the opposite side as will be readily understood from Fig. 1. These uprights support the angularly positioned cross members 28 and 29, which directly support the plows when in inoperative position.

Figures 4, 5, 13:
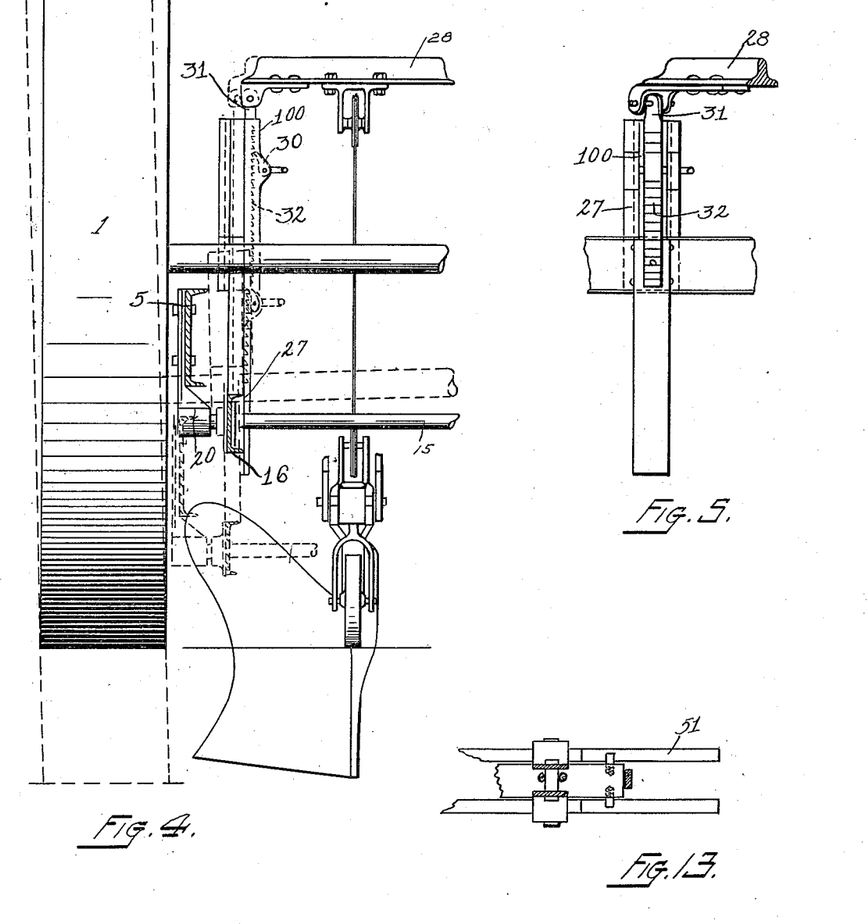
Fig. 4 is an elevation of one side of the machine showing the means for leveling the frame to which the plows are directly supported when the wheel on one side is lower or higher than the wheel on the other.
Fig. 5 is a detail of the means employed for raising or lowering the frame.
Fig. 13 is a detail of the extension at the rear of the plow beam.

It will be readily understood that when plowing ordinary level ground with both driving wheels at approximately the same level, the frame 16 will be practically in a horizontal plane as well as the plow supporting beams 28 and 29. However, in plowing a field the right hand wheel, for instance 1, will run in the furrow caused by the previous traverse of the land by the machine and thus this side of the machine including the frame 16 will lie at an angle to the horizontal plane as determined by the depth of the furrow. For this reason each of the two upright members 27 on the side of the machine adjacent to the wheel 1 is provided with a pivotally supported dog 30 and a channel 100 is secured to each member 27 so formed as to receive a standard 31 vertically slidable therein. This bar or leg is pivoted to the end of the cross beams 28 and 29 in each instance and is provided with the ratchet teeth 32 in which the dog 30 is adapted to engage. This apparatus is illustrated in Figs. 4 and 5 and from which it may be readily seen that as the wheel 1 is dropped to a depth to which the plow enters the ground the beam 28 may be raised to parallelism with the ground by simply raising the end thereof to which the bar 31 is pivoted, thus the frame members 28 and 29 may be maintained substantially in horizontal relation with the ground so that on raising the plows from the ground they will all be raised to an equal height thereabove. This arrangement is possible by reason of the means for raising the plows being adapted to allow the plows to drop away from supporting beams 27 and 28 to a greater extent in some instances, as is hereinafter shown.

Figure 10:
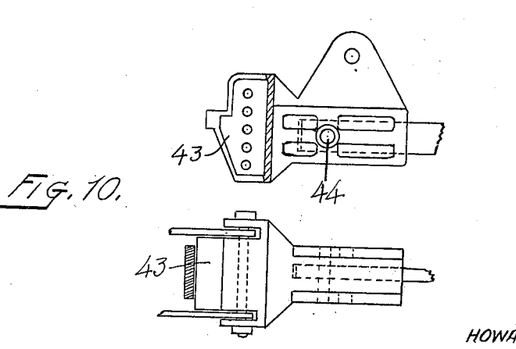
Fig. 10 is a detail of the clevis to which the forward end of the plow beam is attached.

As will be understood from Fig. 1 several plows are supported by the frame at an angle thereto so that the plows follow one behind the other, each plow is of the usual form having the ordinary mold board and plow point and wheel 40 adjustable on the beam 41 (although not here shown) by means of which the depth to which the plow may enter the ground may be predetermined and varied as circumstances may demand. The plows are attached to the draft beam 23 as may be understood from Figs. 1 and 3 by means of the draw bars 42 and a pair of such bars is provided for each plow beam pivotally attached to the draft beam 23 and also pivotally secured to the clevis member 43 and adjustable thereon, as may be understood from Figs. 3 and 10. This adjustment of the draw bar and clevis member enables a vertical adjustment thereof to be made to apply the power to draw the plow at different points on the clevis member causing the plow point to be moved forward at a greater or less angle to the horizontal. This clevis member 43 is recessed at the rear end to receive the end of the plow beam 41 and this plow beam is secured to the rear end of the clevis member by means of a pin 44 passing through the clevis member 43 and plow beam. This pin is made of wood or some material of such strength as to be capable of drawing the plow through the ground and yet of sufficient weakness to break under an excessive strain as when the plow meets an obstruction. The purpose of thus providing the wooden pin is to prevent breakage of the plow or connected parts.

On the upper part of the clevis member is carried a pulley 45, as will be understood particularly from Fig. 3 and above the forward end of the plow beam on the cross bar 28 is a similar pulley wheel 46 and directly above the rear end of the plow beam on the cross member 29 is another pulley or sheave 47. The rear end of the plow beams is provided with an extension member 48 having a pin 49 extending therethrough and projecting on each side thereof. A pair of parallel bars 50 are pivotally supported on the axis of the pulley 46 on the bar 48 having the angularly positioned ends 51 passing each side of the extension 48 of the plow beam and beneath the projecting ends of the pin 49 a cable 52 passes over the pulley 46 around the pulley 45 at the front end of the plow beam over the pulley 47 and is secured to the parallel bars 50 near the rear end by means of the yoke member 53. The front end of the cable is attached to the drum 54 on the shaft 15 and it is operated by the belts 10 and 11 as heretofore described. This drum 54 is loose on the shaft as will be understood from Figs. 1 and 6 and there is a drum 54 for each plow. The hub of this drum is provided with one member 55 of a jaw clutch, the companion member 56 of which is splined to the continuously driven shaft 15. The clutch 56 may by means hereinafter described be moved into its companion 55 on the drum 54 and the drum thus made to revolve. The drum is provided with a single groove for the cable 52 which is attached thereto and the diameter of the drum is such that one revolution thereof will wind the cable and raise the plow from operative to inoperative position as will be understood from Fig. 3. It is to be noted that as the cable begins to wind on the drum 54 it draws through the pulley 45 on the front end of the plow beam tending to first straighten the cable between the pulleys 46 and 47, and by this arrangement the plow is made to draw point first out of the ground and that as the cable becomes straightened or the upward movement of the front end of the plow beam stopped, the rear end of the plow beam is raised by means of the bars 50 to which the rear end of the cable is attached. As is hereinafter described automatic means are provided to disengage the clutch members 55 and 56 when the plow has been raised to inoperative position.

The front supporting bar 60 is provided with a recess 61 adapted to receive and support the forward end of the plow beam or clevis thereon and the rear supporting bar 62 is provided with a similarly recessed portion 63 to receive and support the rear end of the plow beam or portion 48 thereon. Both the bars 60 and 62 are provided with depending portions 64 and 65 respectively. The portion 64 of the forward supporting bar lies between the two draw bars attached to the clevis member 43 at the forward end thereof and, as the supporting bar 60 is pivoted at a point to the rear of a point vertically above the extreme forward end of the clevis member, the said supporting bar tends to at all times, swing by gravity toward the clevis. Thus on raising the forward end of the plow beam as heretofore described, the said clevis end will engage in the recess 61 provided on reaching the proper height. A stop member 67 is provided on each forward bar 60 preventing movement of the clevis end thereabove, which causes the cable to draw through the rear pulley 47 and raises the rear end of the plow in like manner to the forward end until the recessed portion 63 may swing beneath the end 48. This supporting bar 62 swings by gravity to engage the rear end of the plow beam in the same manner as the forward supporting bar 60. Upon the cable being wound up by the drum 54, as described, the plow will be raised from the ground and automatically supported thereabove by the supporting bars 60 and 62.

As heretofore stated the drum 54 is operated by means of a member 56 splined to the shaft 15. This clutch is moved on the shaft by means of the forked arm 70 secured to a shaft 71 carried in brackets 72 and 73, as shown more clearly in Figs. 6 and 7. Also secured to the shaft 71 is a rock arm 74 and a spring 75 is provided tending to at all times withdraw the clutch member 56 from its companion 55 on the hub of the drum 54. This arm may be depressed by means of the foot lever 76 pivoted thereto. The rock arm 74 is provided with a projecting lug 77 and, when depressed, this lug engages beneath the notch 78 in the pivoted releasing lever 79 having an end terminating adjacent the drum wheel. This lever is provided with a weight 80 tending to at all times hold the notched end 78 in position to engage the lug 77.

When the foot lever 76 is depressed, therefore, the clutch 56 engages the companion member 55 and is held in engagement thereby by reason of the lug 77 being engaged by the notched end 78 of the lever 79. The drum 54 will thus continue to rotate until the clutches are disengaged.

Figures 6, 7:
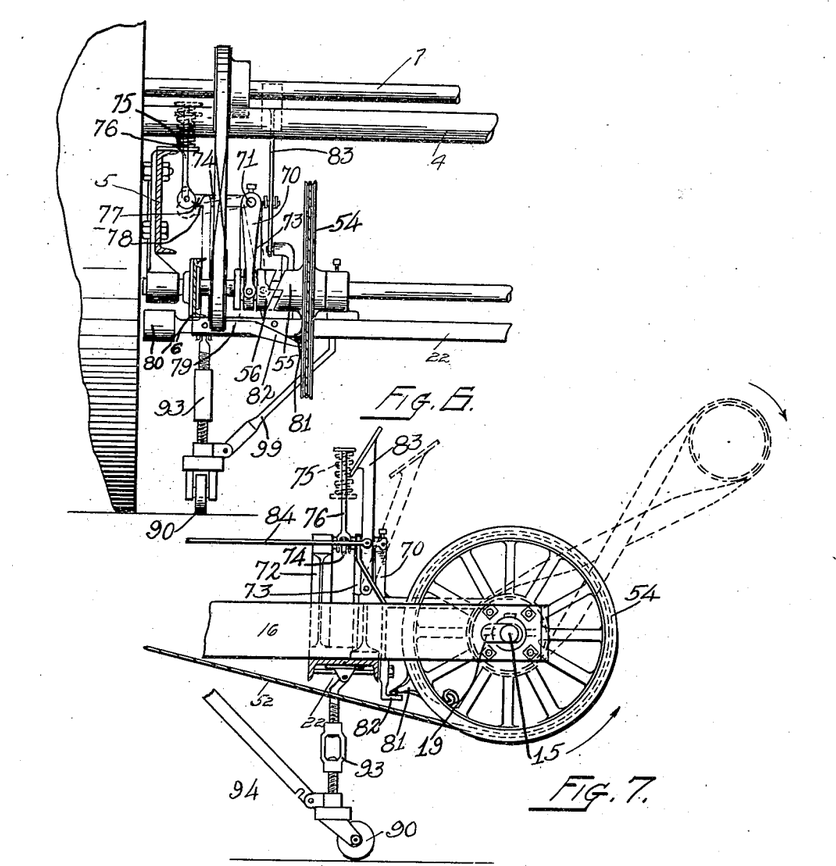
Fig. 6 is a detail showing the mechanism utilized in raising a plow out of the ground.
Fig. 7 is a side view of the plow operating mechanism.
Figure 7:
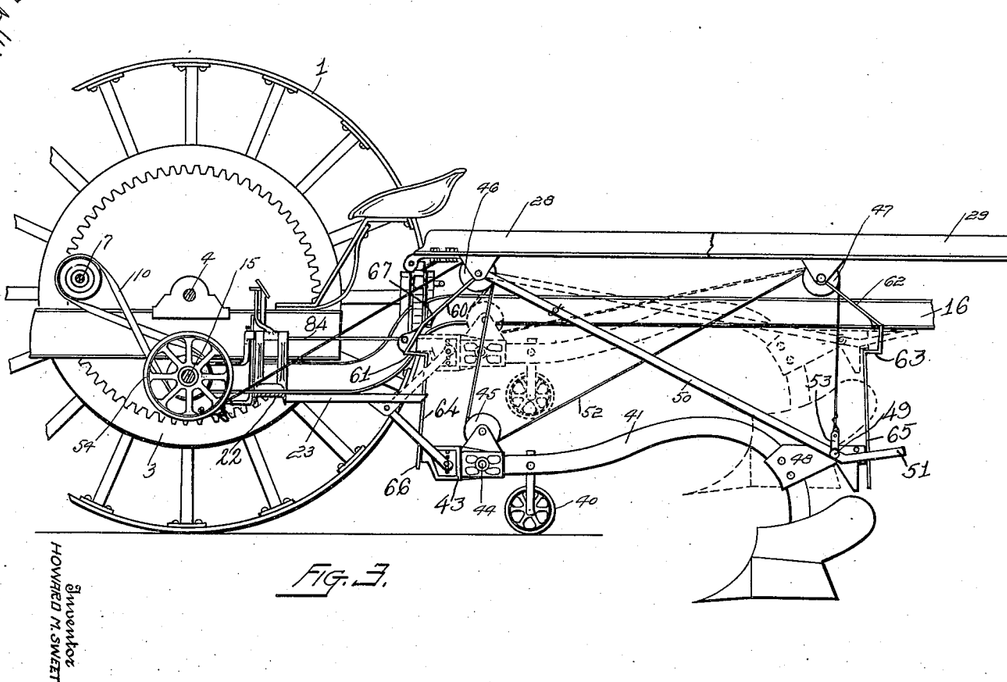

Each cable 52 is of sufficient length to allow the respective plow to drop to the lowest required position below the beams 28 and 29 to which the pulleys 46 and 47 are secured respectively and the diameter of the drum 54 is such that one revolution thereof may take up the greatest possible slack occurring in the cable when the plows are down even if the ends of the beams 28 and 29 are raised on one side, as indicated in Fig. 4. The drum is provided on one side with a lug 81 and the lever 79 is provided with a bent end 82 projecting into the path of movement of the lug 81. The relationship of the parts is such that, on revolution of the wheel, the lug 81 will contact the bent end of the lug 82 and withdraw the notch end 77 of the lever from the lug on the arm 74 which releases the arm to movement by the spring 75 and disengage the clutch. It is to be noted that the lug 81 does not pass beyond the bent end 82 of the lever 79 as will be readily understood from Fig. 7. As the lever is tripped by the lug 81 the clutch is withdrawn and the drum will cease to rotate leaving the lug and lever substantially as shown in Fig. 7.

To drop the plows into position to enter the ground a foot lever 83 is mounted on any convenient part of the frame work and is connected by means of a cable or rod 84 with the front plow supporting bar 60 as will be more readily understood from Fig. 3. In moving this lever forward, the respective supporting bar 60 is withdrawn from the forward end of the clevis allowing the front end of the plow to first drop as the drum is loose on the shaft at this time and substantially in the position shown in the Fig. 7. This dropping of the forward end of the plow pulls the cable from the drum and reverses the drum in the direction of rotation to the extent demanded by the distance the plow beam has to fall. As the forward end of the plow beam, or rather the wheel 40 thereon, engages the ground the rear end of the plow beam automatically withdraws from the supporting bar 63 and by forward movement of the apparatus, the plow will draw point first into the ground, as will be readily understood.

In thus dropping the plow from the supporting bars 60 and 62, the cable is withdrawn from the drum 54 to the extent necessary to enable the plow to reach the position required for plowing. When one side of the supporting beams 28 and 29 are raised, as shown in Fig. 4 for the purpose stated heretofore, the plow on that side of the apparatus will withdraw more cable from the drum or rotate the drum to a greater extent than the plow on the opposite side of the apparatus and, as has been heretofore stated, the drum is of such diameter as to hold sufficient cable in one turn to allow the plow to drop the greatest distance it may be required when the beams 28 and 29 are raised. In this condition with one end of the beams raised no two plows will turn their respective drum to the same extent. This, however, does not affect the lifting of the plows from the ground for the reason that, if but a half turn of the drum backward is required to release the cable to allow a plow to enter the ground, then upon moving the clutch 56 into engagement with the member 55 on the drum, the drum will only rotate a half turn until the lug 81 engages the end 82 of the releasing lever. If it require a full turn backward of the drum to release sufficient cable, then upon placing the clutch members in engagement the drum will necessarily rotate nearly a complete revolution to bring the lug into engagement with the disengaged lever. Thus, irrespective of the extent to which the drums are rotated backward by the dropping of the plows, the plows will all be withdrawn from the ground to occupy an exactly similar position below the supporting frame work.

Each plow is provided with similar control levers 76, 79 and 83 and each plow is thus independently controlled and during the operation of plowing any one of the plows may be raised from the ground without affecting the operation of the other plows and obstructions such as heavy stones or the like may be avoided by raising one or more of the plows in front of which the obstruction may lie.

Frequently in plowing operations and unexpected or unknown obstruction is encountered sufficient to cause a breakage of the plow if drawn by power as may be used with this apparatus. This would result in a breakage of the plow or supporting parts thereof. For this reason the pin 44 passing through the clevis 43 and forward end of the plow beam is made of wood or such other material as would readily break on the stoppage of the plow by an obstruction. On the breaking of this pin the plow will be left in the ground and the apparatus and remaining plows continue to move forward away therefrom. In so doing the pin or pins resting on the rear ends of the bars 50 passes off from the end of the supporting bars without disarrangement of any of the supporting parts. It is principally for this reason that the bar 50 is provided to which the rear end of the cable 52 is secured, and further, that the pulleys 45 are supported on the clevis members 43 instead of on the plow beam proper.

Figures 8, 9:
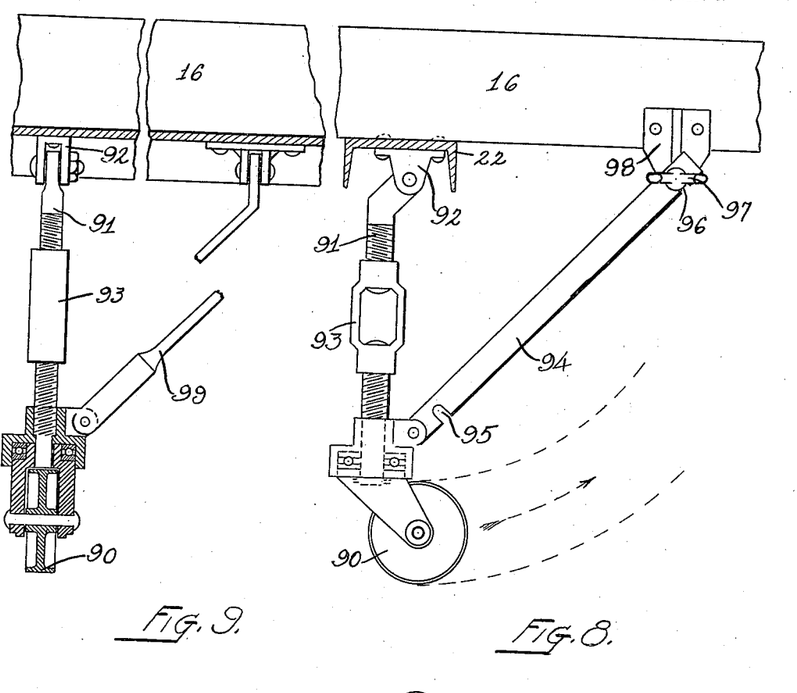
Fig. 8 is a side elevation of the caster wheel and brace used at one forward corner of the plow frame.
Fig. 9 is a similar view taken from the front of the machine.

As heretofore stated the shaft 15 rides in a slot 19 in the forward ends of the plow frames 16, as is clearly shown in Fig. 7 and the ends of the shaft are supported in brackets 20 bolted to the rear end of the frame members 5 and 6 of the draft apparatus, which bracket is shown clearly in Fig. 4. If it be desired to detach the gang plow from the draft apparatus, the bolts by means of which the brackets are connected to the frames 5 and 6 are removed and the belts 10 and 11 removed from the pulleys on the shaft 15. The draft apparatus may then be withdrawn from the plow and utilized for other purposes. When the draft apparatus has been withdrawn as mentioned, the forward ends of the frames 16 of the gang plow may be supported by caster wheels 90 as indicated in Figs. 8 and 9. A caster wheel 90 is provided at each forward corner of the gang plow frame and is supported by an upright member 91 pivoted to a bracket 92 secured to the cross frame 22 as indicated clearly in Fig. 6. The upright member 91 is formed of two parts terminating in threaded ends to receive a turn-buckle 93 by means of which the standard may be lengthened or shortened, as may be necessary to hold the frame at the proper height. This member 91 is maintained in upright position by means of two brace arms extending at a right angle one to the other. One of the arms 94 is provided with two notches 95 and 96 each adapted to engage over a thumb nut 97 threaded in a bracket 98 secured to the frame member 16. When the caster wheel 90 is in operative position as shown in Fig. 8 the notch 96 engages the thumb nut indicated, and when the caster wheel is folded to inoperative position parallel with the frame member 16 the thumb nut 97 is loosened and the notch 95 brought up to engage the thumb nut by means of which the caster wheel is maintained in inoperative position, as will be readily understood. The brace bar 99 extends at a right angle to the brace bar 94 as shown in Fig. 9, and is pivotally attached to the caster wheel support and to the beams 22. The bar 99 and standard 91 have their axes substantially in alignment or in same horizontal plane so that the bar 94 may be moved to swing both the standard 91 and brace bar 98 about their respective points of support. These caster wheels are not shown in the main views 1, 2 and 3, to avoid confusion.

From the foregoing description, it becomes evident that the device is comparatively simple in operation, requiring little or no mechanical skill to operate the plows in the performance of the work for which it is adapted, and that the device is admirably adapted for operation by a power driven draft apparatus including the driving wheels heretofore mentioned, and that the device may be drawn by the usual draft animal in which case the shaft 7 including the differential gearing thereon would be driven by the internal gear 3 instead of by power applied through the differential gearing as heretofore described. The operation of the device is essentially the same in either case, and I therefore do not desire to confine myself to combination with a self-propelled power apparatus, but what I do claim and desire to secure by Letters Patent is—

1. In a gang plow, a framework, a series of plows carried thereby, a single cable for each plow, a drum for each cable operable at will to wind the cable, the cable being so connected as to raise the forward end and thereafter raise the rear end of the plow to inoperative position, an automatic means for each plow beam adapted to receive and support the same when brought to inoperative position, and a trip for releasing the drum from operation as the plows reach inoperative position.

2. In a gang plow, a framework, a series of plows in staggered relation carried thereby, a cable for each plow, a drum for winding each cable to raise the respective plow to inoperative position, the cable passing through a sheave on the framework, thence through a sheave at the forward end of the plow beam, and thence over a sheave on the framework, a bar pivotally connected at the forward end to the framework and extending rearwardly adapted to support the rear end of the plow beam, the end of the cable being attached to the bar, automatic means for each plow beam adapted to receive and support the same when brought to inoperative position, means for releasing the support at the forward end of the beam to permit the plow to drop point first into the ground and to draw out of the supporting means at the rear of the beam.

3. In a gang plow, a framework, a series of plows supported thereby, a draft device having a breakable connection with the forward end of each plow beam, the connection being such as to permit disassociation of the beam with the draft device under strain in excess of that normally required to draw the plow, a single cable for each plow, the cable running over a sheave on the framework through a sheave attached to the draft means thence over a sheave at the rear of the frame, a bar pivotally connected to the frame adapted to support the rear end of the plow beam, the cable being attached to the bar, and means operable at will for winding the cable to raise the plow out of the ground to inoperative position, the construction permitting withdrawal of the plow from the draft means and the cable and bar.

4. In a gang plow including a wheeled frame, power plant and a two-part driving shaft having a differential gear mechanism interposed between adjacent ends thereof, the combination therewith, of a pulley loosely mounted on each part of the said two-part shaft, a clutch device for each pulley for driving the same on forward rotation of the respective part of the shaft, a second shaft mounted in the said wheeled frame with which each of the pulleys is continuously connected for driving the same, a plow frame having a slotted portion through which the said two-part shaft passes, a series of plows carried by the plow frame, a cable for each plow, a winding drum for each cable on the said second shaft, and means for each drum operable at will to cause rotation of the drum with the shaft to raise the respective plow, a supporting device for each plow automatically engaging the same when raised to inoperative position, and a trip for disengaging each winding drum automatically operable when the respective plow reaches inoperative position.

5. In a gang plow, a framework, a series of plows carried thereby, a series of rotatable drums forward of the plows and corresponding in number to the number of plows, a cable extending from each drum and connected with the forward and rear ends of the respective plow in such manner that rotation of the drum and winding of the cable first raises the forward end and thereafter raises the rear end of the plow to inoperative position, and means for releasing the plows in a manner to drop point first into the ground.

In testimony whereof, I sign this specification.

HOWARD M. SWEET.